Jan. 9, 1951 P. W. THORNHILL 2,537,491
SUSPENSION DEVICE FOR VEHICLES
Filed Sept. 21, 1944 2 Sheets-Sheet 1

Inventor
Peter Warlow Thornhill
by Stevens and Davis
his attorneys

Jan. 9, 1951   P. W. THORNHILL   2,537,491
SUSPENSION DEVICE FOR VEHICLES
Filed Sept. 21, 1944   2 Sheets-Sheet 2

Inventor
Peter Warborn Thornhill
by Stevens and Davis
his attorneys

Patented Jan. 9, 1951

2,537,491

UNITED STATES PATENT OFFICE 2,537,491

SUSPENSION DEVICE FOR VEHICLES

Peter Warborn Thornhill, Leamington Spa, England, assignor to Levitation Limited Application September 21, 1944, Serial No. 555,150
In Great Britain September 2, 1943

13 Claims. (Cl. 267—64)

This invention relates to suspension devices for vehicles and especially to those of the kind in which the static load is supported in a resilient manner by a quantity of compressed gas, the device having a working space, the volume of which varies as the position of the wheel or equivalent changes with respect to the vehicle body or equivalent, variation in the volume of the working chamber being arranged to cause the pressure of the compressed gas to change. Suspension devices of this form are already known in which the variable volume working space is largely occupied by gas under pressure, the arrangement shown in British Specification No. 450,852 being an example. In this prior arrangement a compressed gas chamber of constant volume communicates with the working space by way of a double-acting valve, the operation of which latter is controlled by a further quantity of compressed gas disposed within an auxiliary chamber and having a very constricted means of communication with the main gas chamber.

It is an object of the invention to provide an improved, compact and relatively simple form of suspension unit in which air or other gas is used in a particularly efficient manner both as a resilient medium and as a means for damping the movement of the device. It is a further object of the invention to provide an improved form of telescopic suspension unit which is particularly adapted for use in connection with motor road vehicles.

According to the invention a suspension device for a vehicle comprises a pair of relatively movable elements for attachment to the vehicle body or equivalent and to the vehicle wheel or equivalent, respectively, said elements defining a first variable volume space containing gas under pressure, a second gas space the volume of which changes at the same time as, but in the opposite sense to, the volume of the first variable volume space, a damping valve adapted to connect said two variable volume working spaces, and an auxiliary chamber having a constricted communication with the first variable volume space and bounded by a control piston, which latter is acted upon by gas within the auxiliary chamber, and regulates the passage of gas through the damping valve during recoil movements of the elements.

The invention is illustrated by way of example in the accompanying diagrammatic drawings, in which.

Figure 1:
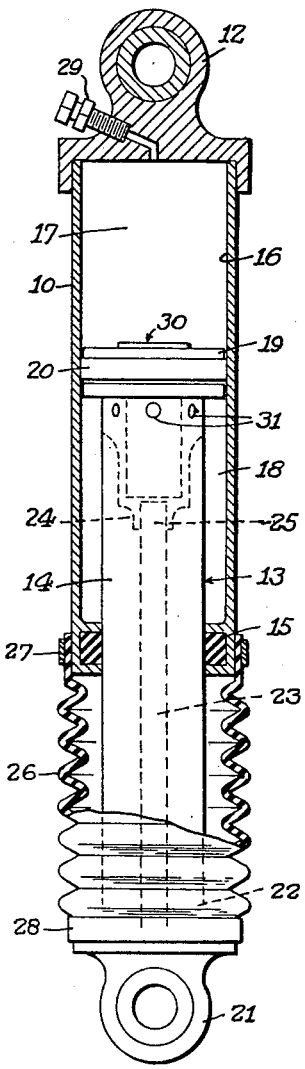
Figure 1 is a side elevation of a typical telescopic suspension device, the cylinder being shown in section.

The suspension device shown in Figure 1 comprises a tubular cylinder 10, which is closed at its upper end by a cap 11 having an integral lug 12 by which the upper end of the device is adapted to be secured to the body or equivalent of the vehicle (not shown). A plunger member, indicated generally at 13, is slidable within the cylinder 10 and comprises a stem portion 14, which is conveniently tubular so as to save weight and is slidable through a packing gland 15 of any suitable construction carried by the lower end of the cylinder 10. The external diameter of the stem 14 is substantially smaller than that of the bore 16 of the cylinder 10, thus leaving an annular working space 18, which is herein referred to as the second variable volume working space. It is separated from what is termed the first variable volume working space 17 at the upper part of the cylinder 10 by a piston head 19, which latter fits slidably in the bore 16 and is provided with a packing ring 20 engaging said bore in a substantially fluid-tight manner. At its lower end the stem 14 is provided with a lug 21 by which the device is attached to a wheel axle or equivalent, and for convenience in manufacture the lug 21 is formed with an axial spigot 22, which fits into the lower end of the stem 14 and is held in position by an axial tension rod 23; the upper end of the tension rod 23 is screw-threaded into a downward extension 24 of the piston head 19, as indicated at 25. An axially extensible tubular boot 26 has its ends secured respectively to the cylinder at 27 and to the plunger member 13 at 28 for the purpose of excluding dirt and other foreign matter from the external sliding surface of the stem 14. The first and second variable volume working spaces 17 and 18 are charged with air or other gas under pressure through an air inlet valve 29 conveniently fitted in the cap 11 of the cylinder; it should be noted that in the suspension devices which are described herein the working spaces 17 and 18 have no means of communication with the interior of the plunger stem 14, and this stem functions as, and can be regarded as, a solid rod. Communication between the first variable volume working space 17 and the second variable volume working space 18, through the piston head 19, is controlled by a damping valve, which is indicated generally at 30; passages 31 lead from the damping valve 30 into the working space 18.

Figure 2:
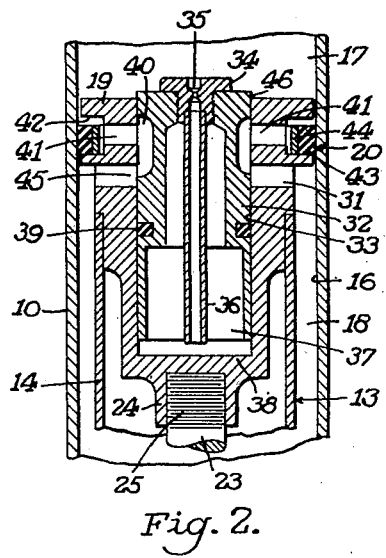
Figure 2 is a fragmentary longitudinal section of the piston head and part of the plunger, the valve being shown in the position which it occupies during shortening of the device and the figure being drawn to an enlarged scale.
Figure 3:
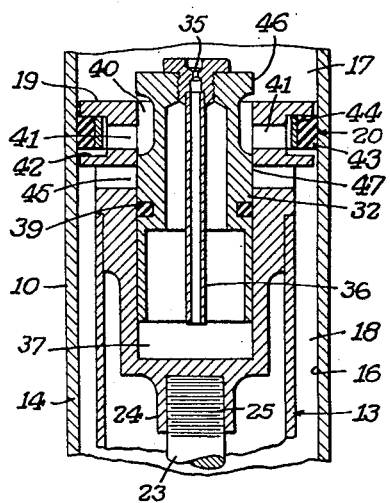
Figure 3 is a similar view showing an operative position of the damping valve during the progress of the following recoil extension stroke.

The preferred form of damping valve is shown in Figures 2 and 3, and comprises a control piston 32, which is slidable in a substantially liquid-tight manner within a bore 33 forming a control cylinder in the piston head 19. The control piston 32 is of a hollow construction and is fitted at its upper end with a bush 34 having a constricted passage 35 communicating at all times with the first variable volume working space 17. Attached to the bush 34 is a tube 36, the lower end of which is in communication with a chamber 37 formed partly within the control piston 32 and partly within the lower end of the bore 33, which latter is closed by an end wall 38. The chamber 37 is herein termed the control chamber, and owing to the provision of the constriction 35, gas pressure in said chamber 37 when the device is in a stable condition tends to become equal to the gas pressure in the first variable volume space 17. Leakage from the control chamber 37 around the outside of the control piston 32 is prevented by the provision of an annular packing ring 39 within a groove in said control piston. Adjacent its upper part the control piston 32 is formed with an annular groove 40, which is in permanent communication with a number of radial passages 41; the groove 40 and passages 41 together constitute what is herein termed the transfer passage. The passages 41 lead into the inner curved surface or bottom of a circumferential groove 42 formed in the piston head 19 for the accommodation of the packing ring 20. This packing ring comprises an outer annulus 43 of soft material such as rubber or rubberised canvas, and an inner ring 44 which is composed of metal and is arranged to spring outwards so as to hold the outer ring 43 in firm engagement with the bore 16 of the cylinder. It will be noted that the axial measurement of the packing ring 20 is substantially less than the corresponding width of the groove 42, and this enables the packing ring 20 to function as the combined valve member of a dual non-return valve device, controlling the flow of gas between the transfer passage 40, 41 and the first and second variable volume spaces 17 and 18. Substantial clearance is provided between the bore 16 and the outside of the piston head 19 so as to enable fluid to flow from either of the working spaces 17 and 18 into the groove 42, or axial passages or grooves may be formed in the piston head for this purpose. It will be seen that when the plunger 13 is moving upwards, pressure fluid tends to flow from the working space 17 to the working space 18. The packing ring 20 tends to be left behind, as shown in Figure 2, due to the friction between it and the cylinder bore 16, and prevents said fluid from passing into the space 18; it can flow freely, however, into the transfer passage 40, 41. The packing ring 20 is also urged towards the bottom of the groove by the superior gas pressure in the working space 17. Conversely when the plunger 13 is moving downwards, a superior pressure exists in the working space 18, the packing ring 20 being lifted so as to bear against the upper side wall of the groove 42, thus sealing the transfer passage 40, 41 from the working space 17 and placing it in free communication with the working space 18.

The passages 31 in the piston head 19 lead to a series of ports 45 in the bore 33 at a position below the passages 41, the arrangement being such that when the control piston 32 falls to its retracted position shown in Figure 2, the groove 40 connects together the passages 41 and 31, said passages 41 then being isolated from direct communication with the first variable volume space 17 by the engagement of the upper land 46 of the control piston 32 within the upper extremity of the bore 33. In a similar manner, when the control piston 32 rises to its extended position, as shown in Figure 3, its outer cylindrical surface 47 below the groove 40 shuts off the passages 31 from the transfer passage 40, 41, and at the same time the land 46 rises above the upper surface of the piston head 19, consequently placing the transfer passage 40, 41 into communication with the first variable volume working space 17. The passages 31, 41 and the groove 40 thus act as a change-over valve actuated by the piston element 32. This piston element 32 has a relatively long free travel, so that although the quantity of air in the control chamber 37 is prevented by the constriction 35 from changing rapidly, the pressure in the auxiliary chamber 37 nevertheless varies in sympathy with the pressure fluctuations in the working space 17 as the plunger 13 reciprocates. The control piston 32 is preferably retained within the bore 33 by a small diameter pin (not shown) fitted to the piston head so as to extend radially into the groove 40 at about the level of the ports 41.

The method of operation of the suspension device is as follows. When the vehicle is travelling along a smooth road or is stationary, and therefore the suspension device is steady, the normal static load is supported by the air pressure within the working space 17 of the cylinder acting downwards upon the piston head 19 over an area equal to the cross-sectional area of the stem portion 14 of the plunger 13, for, of course, the annular space 18 between the stem portion 14 and the cylinder 10 contains air under pressure tending to force the piston head 19 in an upward direction. The constriction 35 of the damping valve 30 causes the pressure of air in the auxiliary chamber 37 to be the same as that in the cylinder space 17. When the vehicle wheel strikes a bump the suspension device tends to shorten but the resistance to such movement is arranged to be as small as possible so as to reduce the increase in the upward thrust on the vehicle body. Thus during the upward movement of the plunger member 13 the pressure of the air in the working space 17 tends to increase and therefore presses down the control piston 32 against the force exerted by the air in the control chamber 37. At the same time the packing ring 20 is forced downwards to the position shown in Figure 2, partly by the effect of the superior air pressure on its upper surface and partly due to the fact that the piston head 19 is travelling upwards within the cylinder 10, so that the packing ring 20 naturally tends to lag behind due to mechanical friction. The air from the upper space 17 can therefore flow freely into the passages 41, the groove 40, and thence into the annular working space 18 by way of the passages 31. The upward movement of the plunger member 13 of course takes place very rapidly, so that the quantity of air in the control chamber 37 does not vary appreciably. By the time that the upward movement of the plunger member 13 is finished, the air pressure in the working spaces 17 and 18 is of course greater than the normal static value, and the piston valve member 32 is consequently well depressed; therefore when the downward recoil stroke of the plunger member 13 commences, the control piston 32 remains in its lowered position. Air from the working space 18, however, tries to return to the working space 17, but this flow is prevented owing to the fact that the packing ring 29 rises into engagement with the upper side wall of the groove 42, as is shown in Figure 3. The downward movement of the plunger member 13 therefore takes place against considerable resistance, the air trapped within the annular working space 18 becoming compressed. In the meantime the air pressure in the working space 17 progressively falls, and the control piston 32 rises in piston head 19, so that when the pressure becomes less than its normal static value, i. e. the pressure at which it is only just able to support the gravitational load on the wheel, the control piston 32 has moved to, say, the position shown in Figure 3. Air from the annular working space 18 is then able to flow through the transfer passage 41, 40 and past the edge of the upper land 46 into the upper working space 17. This flow, however, is automatically regulated so as to prevent the pressure in the working space 17 from rising above its static value, the control piston 32 becoming depressed to close the transfer passage 41, 40 should there be any tendency for the pressure in the space 17 to rise above the value of the pressure in the control chamber 37. It will be noted that when the control piston 32 isolates the transfer passage 40, 41 from the working space 17, as shown in Figure 2, it is in a state of balance as far as the air pressure in the transfer passage 41, 40 is concerned and therefore during the commencement of the downward recoil stroke the pressure of the air in the lower working space 18 has no effect whatever in moving the control piston 32 to its raised position. The damping valve device has the same effect when the suspension device is lengthened with respect to its static position, say owing to the wheel dropping into a pothole. The plunger member 13 can move downwards relatively freely, as this tends to reduce the pressure of air in the upper working space 17, thus causing the air in the auxiliary chamber 37 to force the control piston 32 to its raised position as shown in Figure 3. Air can therefore escape freely from the annular working space 18, past the lower part of the packing ring 20, and through the transfer passage 41, 40 into the working space 17. During this portion of the movement the weight of the vehicle is not fully supported and the body or equivalent therefore tends to assume a downward momentum. Also the final pressure in the working spaces 17 and 18 is less than the static value and is therefore less than the pressure of air in the control chamber 37. Consequently the control piston 32 is held in its raised position, so that when the recoil shortening stroke commences, the air within the working space 17 becomes compressed, for it is unable to flow past the packing ring 20, the latter then being in engagement with the lower wall of the groove 42. When, however, the pressure in the working space 17 becomes greater than the static pressure, the control piston 32 is forced downwards and the parts are then disposed in the positions shown in Figure 2; it will be seen that air from the working space 17 can flow past the upper part of the packing ring 20 and into the working space 18 by way of the transfer passage 41, 40 and the passages 31.

If the pressure in the space 17 should fall below the static value, however, the control piston 32 is automatically raised, thus shutting off the flow of air until the pressure in the working space 17 has again fallen below the static value. A substantial upward thrust is thus maintained upon the cylinder during the shortening stroke, this thrust being at least equal to the normal static load and thus being able to bear the gravitational load in such a manner as to neutralise as quickly as possible the downward momentum which was initially acquired by the vehicle body or equivalent. Suspension devices according to the invention are normally charged with a substantial quantity of oil or other lubricating liquid, and the control piston 32 is provided with the tube 36 in order to prevent the control chamber 37 from becoming completely filled with such liquid, as of course this would render the damping valve device ineffective. During the telescopic movements of the piston 10 and plunger member 13 a slight alternating flow of air occurs through the constriction 35; therefore if the liquid should tend to accumulate in the control chamber 37 to a level above the bottom of the tube 36, this liquid will be ejected through said tube whenever the pressure in the control chamber 37 exceeds that in the working space 17, whereas when the opposite conditions prevail air from the working space 17 will be forced into the control chamber 37.

It will of course be realised that the lower part of the combined piston and change-over valve member 32 acts in the manner of a control piston which is subject to the pressure in the auxiliary chamber 37, and that the working characteristics of the suspension device can be modified by making the area of this control piston smaller or greater than the effective area over which the pressure in the working space 17 acts upon the control piston 32. It will moreover be understood that the construction of the piston head 19, and more particularly the damping valve device 39 disposed therein, may be varied in numerous ways so as to secure substantially the same effects as those described above.

Figure 4:
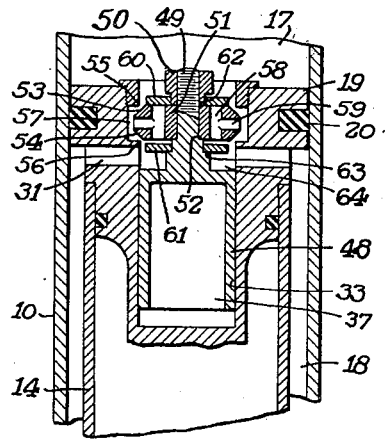
Figures 4, 5, 6 and 7 are similar views showing modified constructions of damping valve.

In the modified construction of damping valve shown in Figure 4 the control chamber 37 is bounded by a control piston 48, which is of inverted cup shape and which fits slidably within the bore 33 just sufficiently loosely to allow the air pressure in the control chamber 37 to become equal to that in the working space 17 when the suspension device is in a stable condition; the leakage past the control piston 48 is, however, not sufficiently great to bring about substantial changes in the quantity of air in the control chamber 37 as a result of the rapid fluctuations in pressure which occur in the suspension device when the latter is in a state of telescopic oscillation. At its upper part the control piston 48 is formed with a spigot 49 having a nut 50 which serves to clamp a head member 51 against a shoulder 52. This head member has at its upper and lower parts frusto-conical surfaces 53 and 54 respectively adapted to engage in a substantially fluid-tight manner with corresponding seatings 55 and 56 at the upper and lower extremities of a circumferential enlargement 57 of the bore 33. The head member 51 is formed with passages 58 extending parallel with its axis, and with radial passages 59 which lead from the passages 58 into the enlargement 57. In this instance the enlargement 57 and the passages 58 and 59 constitute what is termed the transfer passage.

The upper and lower ends of the passages 58 are controlled by a pair of opposing non-return valves comprising annular washers 60 and 61 which are adapted to fit in a fluid-tight manner against the upper and lower flat surfaces of the head member 51. The washers 60 and 61 are free to move axially for a short distance, the washer 60 being slidable upon a spigot 62 formed on the lower part of the nut 50, while the washer 61 is slidable upon the base portion of the spigot 49 and has its travel limited by a shoulder 63. The axial separation of the seatings 55 and 56 is sufficient to allow the head member 51 freedom to move axially for a substantial distance; it follows, therefore, that when the head member 51 is closing one of these seatings 55 and 56, the other is open. Surrounding the lower part of the spigot 49 is an annular space 64 which is in permanent communication with the passages 31 leading to the annular working space 18. The packing ring 20 in this instance is a snug fit within the groove in the piston head 19 and merely serves to prevent leakage past the outside of the piston head 19.

This modification operates in the same manner as in the previous example. The air pressure which is present in the control chamber 37, and which is equal to the static pressure of the device, governs the operation of the change-over valve constituted by the head member 51 and the seatings 55 and 56. Thus during shortening of the device from its static position the control piston 48 is depressed, and air from the working space 17 flows past the seating 55, through the transfer passage 57, 58, 59, and enters the working space 18 by opening the non-return valve 61 and flowing through the passages 31. During recoil the head member 51 remains depressed and thus traps the air within the working space 18 until such time as the pressure within the working space 17 falls below the normal static value; at this point the head member 51 is raised, thus opening the seating 56 and enabling air from the working space 18 to flow through the transfer passage and past the non-return valve 60 into the working space 17 only so long as the pressure in said space 17 does not exceed the static value. When the device becomes elongated beyond its static length the reduction in pressure within the working space 17 causes the head member 51 to be raised into engagement with the seating 55, so that air can flow freely from the contracting working space 18, through the passages 31, past the seating 56, and through the transfer passage, past the non-return valve 60 into the working space 17. At the commencement of the following shortening or recoil stroke the air is prevented from returning immediately to the working space 18, as the head member 51 remains in engagement with the seating 55, since the air pressure in the control chamber 37 is smaller than that prevailing in the working space 17. As a result the device continues to shorten until the pressure in the working space 17 builds up to a value which is in excess of the static value, whereupon the head member 51 moves downwards into engagement with the seating 56, thus permitting air to escape from the working space 17 back through the non-return valve 61 and into the working space 18.

Figure 5:
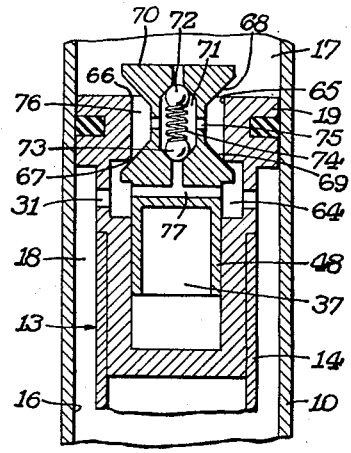

With the exception of the damping valve itself the arrangement shown in Figure 5 is the same as that in Figure 4. The piston head 19 is formed at its upper part, however, with a bore 65 terminating in a pair of annular seatings 66 and 67. These are engageable by frusto-conical surfaces 68 and 69 upon a spool-shaped change-over valve member 70, which latter is conveniently formed integrally with the control piston 48. The valve member 70 has an axial passage 71, which is enlarged at its centre part and contains a pair of non-return valves constituted by balls 72 and 73, these being held against their opposed seatings by a coiled compression spring 74. The valve member 70 also has radial passages 75 leading from the central passage 71 into an annular space 76 between the surfaces 68 and 69; the transfer passage is in this case constituted by that part of the passage 71 between the balls 72 and 73, the passages 75 and the annular space 76. A diametral passage 77 leads from the lower end of the passage 71 into the annular space 64, and thence by way of passages 31 into the annular working space 18. As before, sufficient leakage of air takes place around the control piston 48 to maintain in the control chamber 37 a pressure which is equal to that prevailing in the working spaces 17 and 18 when the device is bearing its normal static load. Therefore when the suspension device becomes shortened, due to the wheel encountering a bump, the excessive pressure in the working space 17 causes the valve member 70 and control piston 48 to be depressed, thus closing the seating 66 and opening the seating 67 of the change-over valve. Air can then flow freely through the non-return valve 72, the transfer passage 75, 76, past the open seating 67, into the working space 18. At the beginning of the following recoil stroke, however, the escape of air from the working space 18 is prevented by the fact that the seating 66 remains closed by the surface 68 of the valve member 70; while of course the non-return valve 72 also prevents flow of air into the space 17. When the pressure of the air in the working space 17 falls below the static value, however, the control piston 48 raises the control valve member 70 so that air from the annular working space 18 can then flow through the passage 77, past the non-return valve 73, through the transfer passage 75, 76, and into the space 17 by way of the seating 66. The reverse action occurs when the suspension device becomes lengthened, say due to the wheel falling into a pothole.

Figure 6:
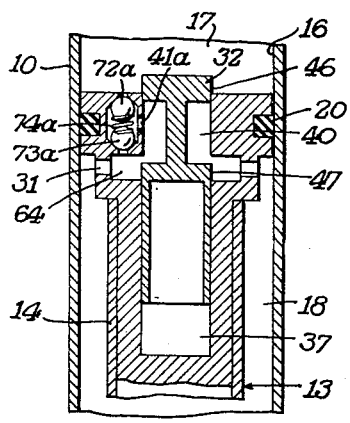

In the arrangement shown in Figure 6 the control piston 32 is arranged as a change-over piston valve of substantially the same form as in Figures 2 and 3. The non-return valves are, however, fitted into the piston head 19 and comprise a pair of balls 72a and 73a held apart in engagement with their seatings by a coiled compression spring 74a. A chamber 71a between the balls is in permanent communication by a passage 41a with the annular groove 40 of the valve member 32, the openings 71a, 41a and 40 together constituting what is termed the transfer passage. The operation of the change-over valve device shown in Figure 6 is exactly the same as that in Figures 2 and 3.

Figure 7:
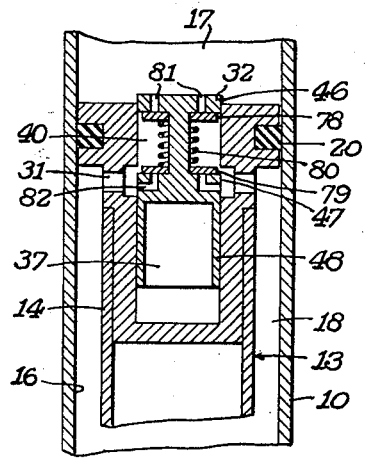

Yet another constructional variation is illustrated in Figure 7, where the change-over valve is again of the piston type comprising a piston valve member 32 formed integrally with the control piston 48. The non-return valves, however, comprise flat metal washers 78 and 79 which are disposed within the annular groove 40 and are urged apart by a coiled compression spring 80. The washer 78 thus closes a circular series of passages 81 formed in the upper land 46 of the valve member 32, while the washer 79 similarly closes the upper ends of a series of L-shaped passages 82 which are formed in the lower land 47 and are in permanent communication with the annular working space 18 by way of the passages 31. In this instance the transfer passage is constituted solely by the annular groove 40; otherwise the relationship of the parts and the method of operation is the same as the devices shown in Figures 5 and 6.

What I claim is:

1. In a pneumatic suspension device for vehicles having a cylinder closed at one end, a plunger of substantially smaller diameter than the cylinder and slidable therein, packing means on the end of the cylinder forming a seal against the plunger, and on the inner end of the plunger a piston head which slidably engages the interior of the cylinder, and divides the interior of the cylinder into a first variable volume space bounded by the piston head and the closed end of the cylinder, and a second variable volume space of annular cross section surrounding the plunger, said first and second variable volume spaces both being charged with gas under pressure, the provision of a pneumatic damping valve system comprising a control cylinder within the plunger, a control piston slidable in the control cylinder to form a control chamber of variable volume, a constricted passageway connecting the control chamber with the first variable volume space, a transfer passage also in the plunger, the control piston being subjected at one end to the gas pressure in said first variable volume space while its other end is subjected to the gas pressure in the control chamber, a change-over valve which is operated by the control piston and is arranged to connect the transfer passage to either the first or the second variable volume space, depending upon the position of the control piston in the control cylinder, and a dual non-return valve device permitting gas to flow from the first and second variable volume spaces into the transfer passage, but not directly from one of said variable volume spaces to the other.

2. A pneumatic suspension device according to claim 1, in which the change-over valve comprises a groove around the control piston permanently connected with the transfer passage, and a port which is formed in the control cylinder and leads into the second variable volume space, the groove sliding beyond the control cylinder and thus communicating with the first variable volume space when the control piston is advanced, and communicating with the second variable volume space by way of the port when the control piston is retracted.

3. A pneumatic suspension device according to claim 1, in which the constricted passage comprises a clearance space between the interior of the control cylinder and the outside of the control piston.

4. A pneumatic suspension device according to claim 1, in which the dual non-return valve device comprises a pair of annular side walls defining a groove around the outside of the piston head, a port leading from the base of said groove into the transfer passage, an annular packing member loosely fitted within said groove with freedom to move axially and seat against either side wall, the packing member engaging at its outer peripheral surface with the wall of the cylinder, while its inner periphery is spaced from the base of the groove.

5. A pneumatic suspension device according to claim 1, in which the dual non-return valve device comprises a cavity in the piston head, an opening connecting said cavity with the transfer passage, opposed seats formed in said cavity leading respectively into the first and second variable volume working spaces, a pair of valve members disposed within said cavity and resilient means urging said valve members into sealing engagement with said seats.

6. A pneumatic suspension device according to claim 1, in which the dual non-return valve device comprises a cavity in the piston head, an opening connecting said cavity with the transfer passage, opposed seats formed in said cavity leading respectively into the first and second variable volume working spaces, a pair of valve members disposed within said cavity and a coiled compression spring engaging at opposite ends with the valve members to urge said valve members apart into resilient engagement with their respective seats.

7. A pneumatic suspension device according to claim 1, in which the dual non-return valve device is carried upon the control piston and comprises a head member fast upon the control piston and having a pair of opposite end faces, passages extending through the head member from one end face to the other, and a pair of annular valve members engageable respectively with the two end faces to seal the said passages and prevent flow of gas thereinto.

8. A pneumatic suspension device according to claim 1, in which the dual non-return valve device comprises an axial spigot formed upon the control piston, a head member fast upon said spigot and having a pair of opposite end faces, passages extending through the head member from one end face to the other, and a pair of annular valve members which are slidable upon the spigot and are engageable respectively with the two end faces to seal the said passages and prevent flow of gas thereinto.

9. In a pneumatic suspension device for vehicles having a cylinder closed at one end, a plunger of substantially smaller diameter than the cylinder and slidable therein, packing means on the end of the cylinder forming a seal against the plunger, and on the inner end of the plunger, a piston head which slidably engages the interior of the cylinder, and divides the interior of the cylinder into a first variable volume space bounded by the piston head and the closed end of the cylinder, and a second variable volume space of annular cross section surrounding the plunger, said first and second variable volume spaces both being charged with gas under pressure, the provision of a pneumatic damping valve system comprising a control cylinder formed by a bore extending through the piston head and having an open outer end, a wall closing the inner end of the control cylinder, a control piston slidable within the outer end of said control cylinder to form a control chamber of variable volume, a constricted passageway extending through the control piston and connecting the control chamber with the said first variable volume space, a transfer passage in the plunger, a change-over valve which is operated by the control piston and is arranged to connect the transfer passage to either the first or the second variable volume space, depending upon the position of the control piston in the control cylinder, and a dual non-return valve device permitting gas to flow from the first and second variable volume spaces into the transfer passage, but not directly from one of said variable volume spaces to the other.

10. In a pneumatic suspension device for vehicles having a cylinder closed at one end, a plunger of substantially smaller diameter than the cylinder and slidable therein, packing means on the end of the cylinder forming a seal against the plunger, and on the inner end of the plunger a piston head which slidably engages the interior of the cylinder, and divides the interior of the cylinder into a first variable volume space bounded by the piston head and the closed end of the cylinder, and a second variable volume space of annular cross section surrounding the plunger, said first and second variable volume spaces both being charged with gas under pressure, the provision of a pneumatic damping valve system, comprising a control cylinder formed by a bore extending through the piston head and having an open outer end, a wall closing the inner end of the control cylinder, a control piston slidable within the outer end of said control cylinder to form a control chamber of variable volume, a constricted passageway extending through the control piston and connecting the control chamber with the said first variable volume space, a tube on the control piston extending from the constricted passageway to a position adjacent the closed inner end of the control cylinder, a transfer passage in the plunger, a change-over valve which is operated by the control piston and is arranged to connect the transfer passage to either the first or the second variable volume space, depending upon the position of the control piston in the control cylinder, and a dual non-return valve device permitting gas to flow from the first and second variable volume spaces into the transfer passage, but not directly from one of said variable volume spaces to the other.

11. A pneumatic suspension device according to claim 1, in which the change-over valve comprises a groove around the control piston forming the transfer passage, opposed frusto-conical surfaces forming opposite side walls of said groove, and a pair of opposed seatings on the piston head, both disposed within said groove and having an axial separation less than the distance between said frusto-conical surfaces, whereby axial movement of the control piston causes only one of the frusto-conical surfaces to engage with its seating.

12. A pneumatic suspension device according to claim 1, in which the dual non-return valve comprises a cavity formed in the control piston, opposed seats in said cavity, passages leading from the cavity by way of said seats into the first and second variable volume working spaces, a permanent connection between the cavity and the transfer passage, a pair of valve members disposed within the cavity and normally engaging said opposed seats and resilient means urging said valve members apart into engagement with said seats.

13. A pneumatic suspension device according to claim 1, a circumferential groove in the control piston, with mutually parallel annular side walls and a stem portion defining the base of the groove, ports formed in said side walls and leading into the first and second variable volume working spaces, respectively, a pair of flat annular valve members disposed slidably upon said stem portion, and resilient means urging the valve members apart into seating engagement with the side walls to close the ports formed therein, the annular valve members constituting the dual non-return valve device, and the groove cooperating with the piston head to form the change-over valve.

PETER WARBORN THORNHILL.

REFERENCES CITED

The following references are of record in the file of this patent:

UNITED STATES PATENTS

| Number | Name | Date |
| --- | --- | --- |
| 1,991,043 | Bates | Feb. 12, 1935 |
| 2,089,657 | Mercier | Aug. 10, 1937 |
| 2,098,398 | Mercier | Nov. 9, 1937 |
| 2,150,390 | Mercier | Mar. 14, 1939 |
| 2,275,462 | Parills | Mar. 10, 1942 |
| 2,393,493 | Brown | Jan. 22, 1946 |

FOREIGN PATENTS

| Number | Country | Date |
| --- | --- | --- |
| 509,104 | France | Aug. 7, 1920 |
| 408,592 | Great Britain | Apr. 5, 1934 |
| 826,293 | France | Jan. 4, 1938 |
| 49,470 | France | Jan. 17, 1939 |